United States Patent
Shen

(10) Patent No.: US 9,946,361 B2
(45) Date of Patent: Apr. 17, 2018

(54) MANAGEMENT FOR WEARABLE DISPLAY

(71) Applicant: QUALCOMM Incorporated, San Diego, CA (US)

(72) Inventor: Jian Shen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 14/460,306

(22) Filed: Aug. 14, 2014

(65) Prior Publication Data

US 2016/0048220 A1 Feb. 18, 2016

(51) Int. Cl.
| | |
|---|---|
| G09G 5/00 | (2006.01) |
| G06F 3/03 | (2006.01) |
| G02B 27/01 | (2006.01) |
| G06F 3/01 | (2006.01) |
| G09G 3/00 | (2006.01) |

(52) U.S. Cl.
CPC ....... *G06F 3/0304* (2013.01); *G02B 27/0172* (2013.01); *G06F 3/012* (2013.01); *G09G 3/002* (2013.01); *G02B 2027/014* (2013.01); *G02B 2027/0118* (2013.01); *G02B 2027/0178* (2013.01); *G09G 2320/0666* (2013.01); *G09G 2360/16* (2013.01)

(58) Field of Classification Search
CPC ........ G02B 27/0172; G02B 2027/0178; G02B 2027/0118; G02B 2027/014; G09G 3/3406; G09G 2320/0626; G09G 2354/00; G09G 2360/145; G09G 2320/08; G09G 2340/10; G09G 2340/12; G09G 5/377; G09G 3/002; G09G 2360/16; G09G 2320/0666; G06F 3/013; G06F 3/0304; G06F 3/012; G06T 11/60; G06T 3/4038; G06T 2207/20212; G06T 15/503; G06T 5/50; H04N 5/23238; H04N 13/0044
USPC ........................................ 345/7, 418–689, 8
See application file for complete search history.

(56) References Cited

U.S. PATENT DOCUMENTS

| | | | |
|---|---|---|---|
| 8,269,692 B2 | 9/2012 | Sugiyama et al. | |
| 8,693,731 B2 | 4/2014 | Holz et al. | |
| 2002/0044152 A1* | 4/2002 | Abbott, III .............. | G06T 11/00 345/629 |
| 2006/0087502 A1 | 4/2006 | Karidis et al. | |
| 2010/0079356 A1 | 4/2010 | Hoellwarth | |
| 2010/0149073 A1 | 6/2010 | Chaum et al. | |
| 2011/0285712 A1* | 11/2011 | Arai ....................... | G09G 3/003 345/426 |

(Continued)

OTHER PUBLICATIONS

International Search Report and Written Opinion—PCT/US2015/044874—ISA/EPO—Oct. 1, 2015.

*Primary Examiner* — Srilakshmi K Kumar
*Assistant Examiner* — Chineyere Wills-Burns

(57) ABSTRACT

A method, an apparatus, and a computer program product for managing a display device are provided. The apparatus may be a wearable device. The apparatus acquires data associated with a foreground corresponding to an image displayed on a display of the wearable device. The apparatus determines an image characteristic of the foreground based on the acquired data. The apparatus detects a change in the image displayed on the display. The apparatus adjusts, upon the detection of the change in the image, a display characteristic of the image based on the image characteristic of the foreground and the change in the image.

30 Claims, 11 Drawing Sheets

(56) References Cited

U.S. PATENT DOCUMENTS

| | | |
|---|---|---|
| 2012/0038663 A1 | 2/2012 | Gustafsson et al. |
| 2012/0050142 A1 | 3/2012 | Border et al. |
| 2012/0092328 A1 | 4/2012 | Flaks et al. |
| 2012/0092369 A1 | 4/2012 | Kim et al. |
| 2012/0293773 A1 | 11/2012 | Publicover et al. |
| 2013/0016070 A1 | 1/2013 | Starner et al. |
| 2013/0114043 A1 | 5/2013 | Balan et al. |
| 2013/0127980 A1* | 5/2013 | Haddick ............... G06F 3/013 348/14.08 |
| 2014/0043498 A1 | 2/2014 | Lee et al. |
| 2014/0132484 A1* | 5/2014 | Pandey ............. G02B 27/0172 345/8 |
| 2014/0145914 A1 | 5/2014 | Latta et al. |
| 2014/0375680 A1 | 12/2014 | Ackerman et al. |
| 2016/0048022 A1 | 2/2016 | Shen |

* cited by examiner

MANAGEMENT FOR WEARABLE DISPLAY

BACKGROUND

Field

The present disclosure relates generally to communication systems, and more particularly, to a wearable display device.

Background

A display device displays an image or a video for a user to view. The display device may be provided as a part of a wearable device that a user can wear. For example, the display device may be provided in a wearable device that can be worn on the user's head, such that the user may be able to view the image on the display device while the user is in motion. When the user wears the wearable device, the display device may be aligned with an eye of the user to enable the user to view a displayed image via the display device. The display device may be transparent, such that the display device does not obstruct the user's view of surrounding objects not displayed on the display device when the display device is positioned in front of the user's eye. Thus, the transparent display device may allow a user to see through at least a part of the transparent display device, even while the transparent display device is displaying an image. There exist several areas for improving a user's viewing experience in the display device. Further, efficient use of power of the wearable display is desired, as the wearable display device may operate on a limited power source (e.g., battery power).

SUMMARY

In an aspect of the disclosure, a method, a computer program product, and an apparatus for managing a display device are provided. The apparatus may be a wearable device. The apparatus acquires data associated with a foreground corresponding to an image displayed on a display of the wearable device. The apparatus determines an image characteristic of the foreground based on the acquired data. The apparatus detects a change in the image displayed on the display. The apparatus adjusts, upon the detection of the change in the image, a display characteristic of the image based on the image characteristic of the foreground and the change in the image.

DETAILED DESCRIPTION

Figure 1:
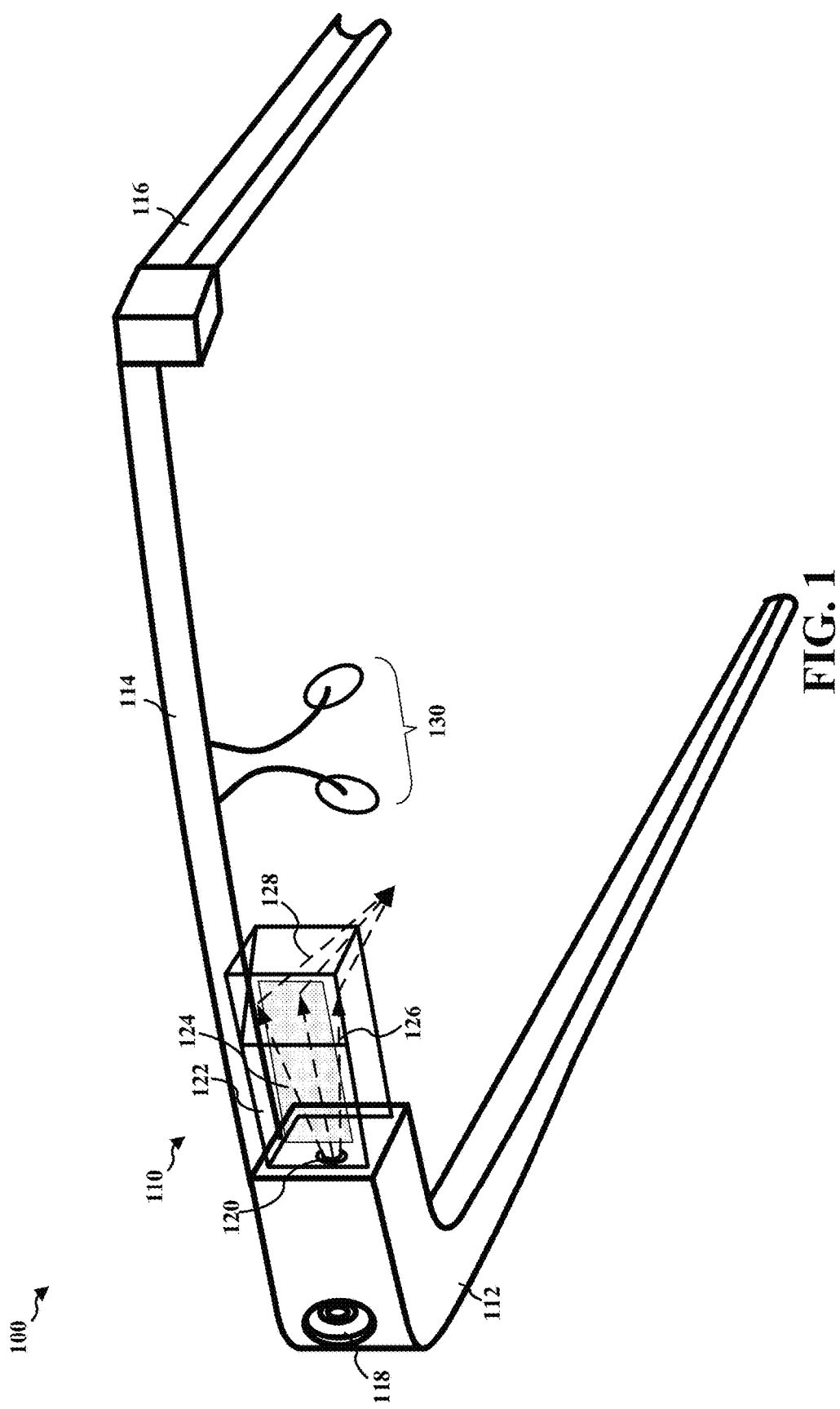
FIG. 1 is an example diagram illustrating an example wearable device having a display device.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of a wearable device will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

Various types of wearable devices have been developed. A wearable device provides an advantage in that a user may easily use the wearable device while in motion or while the user's hands are occupied. The wearable devices have been continuously modified to improve the user experience with the wearable devices and/or to optimize performance of the wearable devices. One area of improvement in the wearable devices is associated with the display of the wearable device.

FIG. 1 is an example diagram 100 illustrating an example wearable device 110 having a display device 122. The example wearable device 110 includes a first side frame 112, a top frame 114, and a second side frame 116, where the top frame 114 connects the first side frame 112 and the second side frame 116. The first side frame 112 may include a processing system including a processor. The first side frame 112 includes a front view sensor 118 in the frame structure 112. The front view sensor 118 may be a camera configured to capture image data. Additionally or alternatively, the front view sensor 118 may be a sensor that can determine a brightness or a color of the front view from the wearable device 110. The first side frame 112 includes an image reproduction device 120 to provide an image to a display device 122 connected to the first side frame 112. The image reproduction device 120 may provide various types of images and videos. The image provided by the image reproduction device 120 may include various types of information, such as weather information, location information, global positioning system (GPS) navigation, a photograph, an email, a text message, and any other information that may be useful for a user, etc. The image reproduction device 120 may be a projector to project an image onto the display device 122. The display device 122 may include a display 124 to display the image provided by the image reproduction device 120. The display device 122 and/or the display 124 may be transparent, such that a user may see through the display device 122 and/or the display 124. The display device 122 may include a prism that is configured to redirect a projected image from the image reproduction device 120 from a first direction 126 to a second direction 128. The display device 122 may include a light source to provide different degrees of brightness in the display 124 of the display device 122. The brightness in the display 124 may be controlled by the processor in the first side frame 112. The wearable device 110 may be configured to communicate with a communications system, such as for example, a wireless wide area network (WWAN) and/or a wireless local area network (WLAN). The wearable device 100 may also include at least one of a GPS device, a gyroscope, a motion sensor, or a speed sensor. The wearable device 110 may include a nose support 130, such that the device 110 may be supported on a user's head by the user's nose.

Figure 2A:
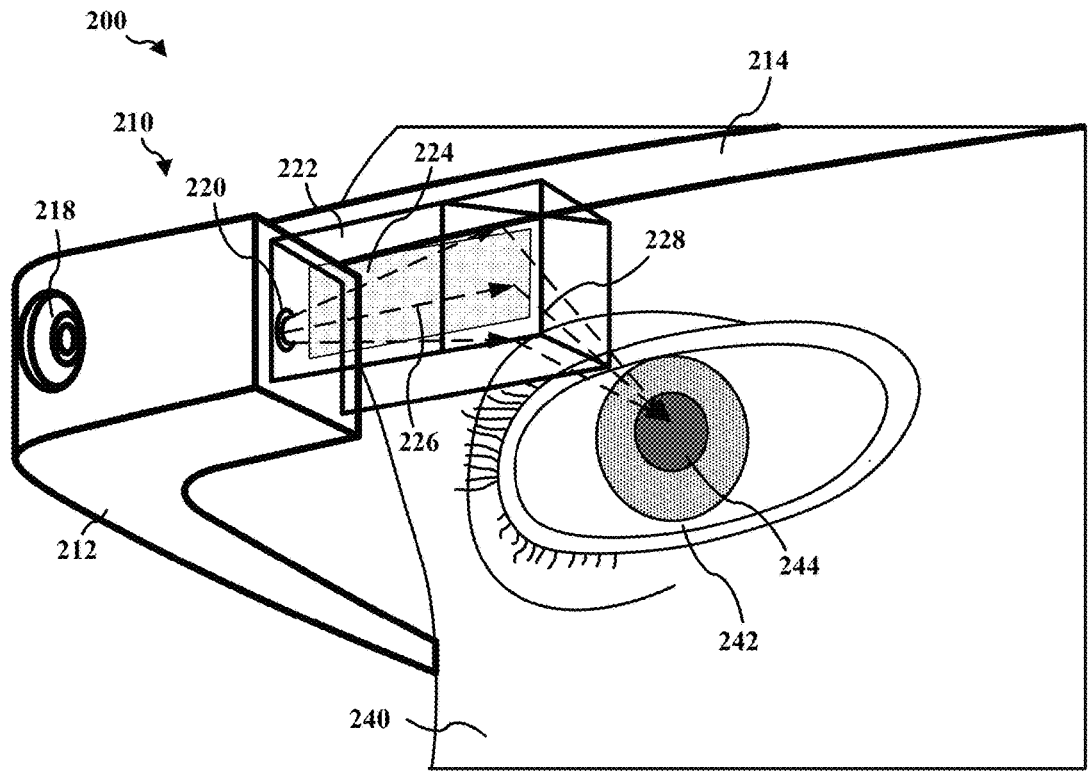
FIG. 2A is an example diagram illustrating a user wearing a wearable device having a display device.

FIG. 2A is an example diagram 200 illustrating a user 240 wearing a wearable device 210 having a display device 222. In an aspect, the wearable device 210 may be similar to the wearable device 110 of FIG. 1. The first side frame 212 is connected to a top frame 214. The first side frame 212 includes a front view sensor 218 and an image reproduction device 220. A display device 222 is connected to the first side frame 212, and is configured to display an image provided by the image reproduction device 220 on the display 224. The first side frame 212, the top frame 214, the front view sensor 218, the image reproduction device 220, the display device 222, and the display 224 are equivalent to the first side frame 112, the top frame 114, the front view sensor 118, the image reproduction device 120, the display device 122, and the display 124 of FIG. 1, respectively. Therefore, detailed explanations with respect to the first side frame 212, the top frame 214, the front view sensor 218, the image reproduction device 220, the display device 222, and the display 224 are omitted for brevity. The display device 222 may include a prism that is configured to redirect a projected image from the image reproduction device 220 from a first direction 226 to a second direction 228 toward an eye 242 of the user 240, such that the user 240 may be able to view an image displayed on the display 224. The user 240 may move his/her pupil 244 of the eye 242 to a position for viewing the image redirected to the second direction 228.

Figure 2B:
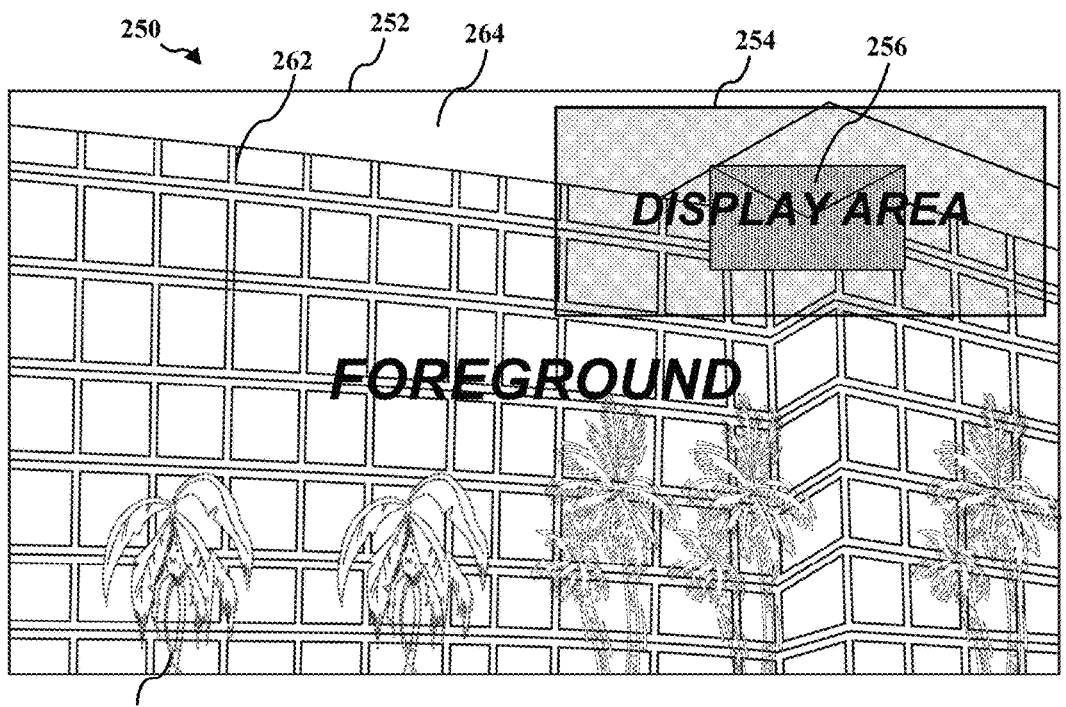
FIG. 2B is an example view in user's perspective when the user is viewing through a display of a wearable device.

FIG. 2B is an example view 250 from a user's perspective when the user looks through a display of a wearable device. For example, the example view 250 may be a view perceived by the user 240 when the user 240 utilizing the wearable device 210 looks at a foreground (reality) in front of the user 240 while viewing the image displayed on the display 224 of FIG. 2A. The user 240 sees a foreground 252 with the user's eyes, where the foreground 252 is what the user sees in the user's natural field of view. In the example in FIG. 2B illustrates that the user is looking at a building 262, a sky 264, and trees 266, and thus the foreground 252 includes the building 262, the sky 265, and the trees 266. The user 240 utilizing the wearable device 210 may also see a display area 254 that corresponds to the display 224 of the display device 222, where the display area 254 includes an image 256 displayed at the display 224. Thus, the display 224 superimposes the display area 254 over the user's view of the foreground 252, and may provide an overlay image 256. The user 240 may be able to see the foreground 252 through the display area 254 because the display 224 is transparent.

In one aspect, a displayed image in the display area 254 may not be distinguishable if a display characteristic (e.g., a color brightness, a color) of the displayed image is similar to an image characteristic (e.g., a color brightness, a color) of a foreground portion that corresponds to the displayed image. If a color or a color brightness of the displayed image is similar to the corresponding portion (e.g., superimposed portion) of the foreground, the displayed image in the display area 254 may not be clearly visible. In one example, if a user wearing the wearable device (e.g., the wearable device 210) is staring at a foreground where a foreground portion corresponding to the displayed area is dark or has a dark color (e.g., low color brightness), and the displayed image on the display is in a dark color, the user may not be able to distinguish the displayed image from the foreground portion. In another example, if a foreground portion corresponding to the display area is a green grass field, and the displayed image is in green, the user may not be able to distinguish the displayed image from the foreground portion. Therefore, an approach to adjust the display characteristic of the displayed image according to the image characteristic of at least a portion of the foreground corresponding to the displayed image is desired. In another aspect, the displayed image may change, and thus it may be desirable to adjust the display characteristic of the displayed image when there is a change in the displayed image. Further, in another aspect, the foreground view that is perceived by the user may change. For example, if the user moves the head from left to right, the user may stop seeing the view on the left side and may start seeing the view on the right side. As the foreground view changes, the foreground portion that corresponds to the displayed image may change, and thus image characteristic of the foreground portion may change as well. Thus, an approach to adjust the display characteristic of the displayed image based on the changes in the image characteristic of at least a portion of the foreground is desired.

According to an aspect of the disclosure, the wearable device (e.g., the wearable device 210) captures image data of a foreground portion corresponding to the display area of the display device of the wearable device. In order to capture the image data of the foreground portion, the wearable device may capture image data of a foreground using a front view sensor (e.g., a camera) of the wearable device and determine the image data for the foreground portion corresponding to the display area. The wearable device determines an image characteristic of the foreground portion based on the captured data of the foreground portion. The wearable device may determine the image characteristic based on a single sample of image data or multiple samples of the image data. If multiple samples are used to determine the image characteristic, the wearable device may average the multiple samples, and determine the image characteristic of the averaged samples. In one example, the wearable device may gather the multiple samples of the image data over a period of time. The image characteristic may include a color brightness and/or a color characteristic of the foreground portion. Based on the image characteristic of the foreground portion, the wearable device may adjust a display characteristic of an image displayed on the display of the display device (e.g., the image in the display area 254). For example, if the image characteristic of the foreground portion indicates that the foreground portion is has a certain color or color brightness, the wearable device may adjust the display characteristic of the image displayed on the display to make the displayed image distinguishable from the foreground portion. The display characteristic may include a color brightness and/or a color characteristic of the displayed image.

In particular, the wearable device may adjust a color brightness and/or a color of the displayed image to make the displayed image more distinguishable from the foreground portion. With regard to the color brightness adjustment, for example, if the image characteristic of the foreground portion indicates that the foreground portion is dark or in a dark color, the wearable device may increase the color brightness of the display image to make the displayed image more distinguishable from the dark foreground portion. In an aspect, the wearable device may determine that the foreground portion is dark or in a dark color if a color brightness of the foreground portion is below a color brightness threshold. On the contrary, in another example, if the image characteristic of the foreground portion indicates that the foreground portion is bright or in a bright/light color, the color brightness of the display image may be decreased to make the displayed image more distinguishable from the bright foreground portion. In an aspect, the wearable device may determine that the foreground portion is bright or in a bright/light color if the color brightness of the foreground portion is equal to or above the color brightness threshold. With regard to the color adjustment, the wearable device may adjust a color of the displayed image to a color that contrasts a color of the foreground portion if the color of the foreground portion is similar to the color of the displayed image. In an aspect, the wearable device may determine that the color of the foreground portion is similar to the color of the displayed image if a contrast ratio between the color of the foreground and the color of the displayed image is below a color contrast threshold. For example, if the image characteristic of the foreground portion indicates that the color characteristic of the foreground portion is green (e.g., when the user stares at a green field), the wearable device may adjust a color of the displayed image to a red color that contrasts the green color of the foreground portion, so as to make the displayed image more distinguishable from the foreground portion. In particular, in such an aspect, the wearable device may adjust the color of the displayed image to increase a color contrast ratio between the foreground portion and the displayed image to a value above the color contrast threshold.

The wearable device may not continuously adjust the display characteristic of the displayed image. In particular, continuously adjusting the image characteristic of the displayed image based on changes in the image characteristic of the foreground may consume processing power and/or consume battery power of the wearable device. In one case, if a user is constantly moving while wearing the wearable device, the image characteristic of the displayed image may continuously change. In such a case, it may not be desirable to constantly adjust the display characteristic of the displayed image based on the continuous change of the image characteristic, especially if the displayed image provides information that does not change often, such as a date or weather. Therefore, according to an aspect of the disclosure, instead of continuously adjusting the display characteristic of the displayed image whenever the wearable device detects a change in the foreground portion, the wearable device may adjust the image characteristic of the displayed image when the wearable device determines that a change has occurred in the displayed image. The change in the display image may occur when a content of the information in the displayed image is changed while the type of the information stays the same and/or when a type of the information in the displayed image is changed. For example, a change in the display image may occur when there is a change in the temperature in the displayed temperature information or when a displayed image including weather information is changed to include another type of information such as time information. If a change occurs in a portion of the displayed image, the wearable device may adjust the display characteristic of such portion of the displayed image. Alternatively, if a change occurs in a portion of the displayed image, the wearable device may adjust the display characteristic of the entire portion of the displayed image. According to another aspect of the disclosure, instead of continuously adjusting the display characteristic of the displayed image whenever the wearable device detects a change in the foreground portion, the wearable device may determine to adjust the display characteristic of the displayed image when a threshold time period has passed after a previous change in the display characteristic of the foreground.

Figure 3A:
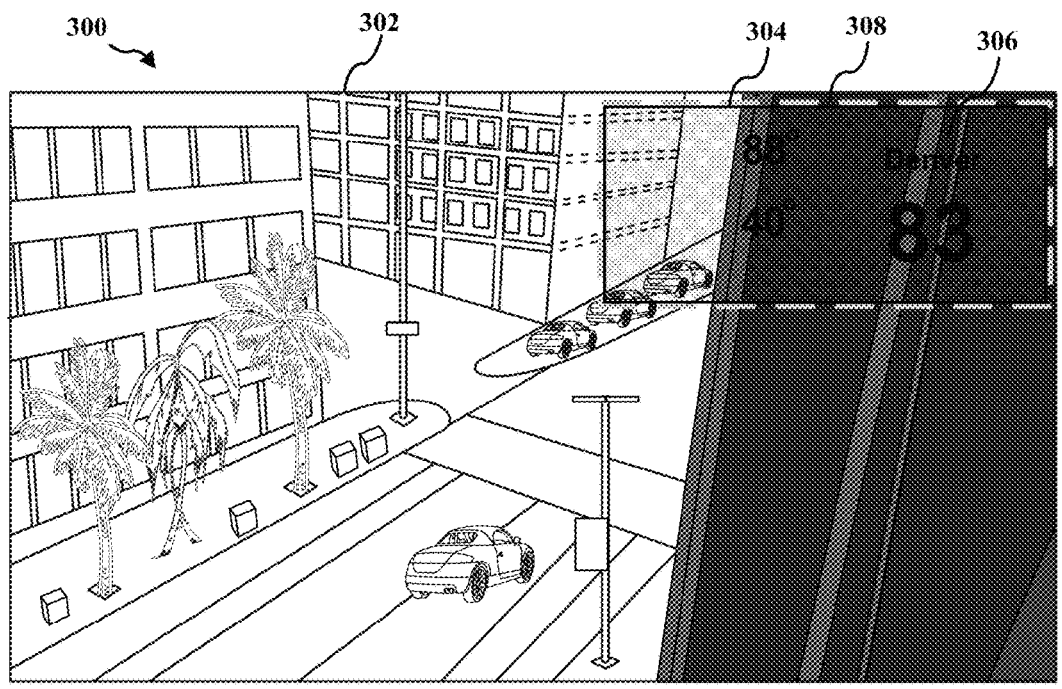
FIG. 3A is an example view in user's perspective when the user is viewing through a display of a wearable device.

FIG. 3A is an example view 300 in user's perspective when the user is viewing through a display of a wearable device. The example view 300 includes a foreground 302 and a display area 304. In FIG. 3A, the user wearing the wearable device is staring at a road outside through a window. Thus, the foreground 302 includes a view of the road outside the window, and further includes a window frame on the right side of the foreground 302. In FIG. 3A, the user activates the wearable device and the wearable device starts displaying in the display area 304 an image 306 showing temperature information in black, where the temperature information includes a current temperature at Denver of 83 degrees, as well as a high temperature of 88 degrees and a low temperature of 40 degrees. However, because the right side of the foreground 302 is a dark window frame, a foreground portion 308 (a dotted line) corresponding to the display area 304 is mostly dark. Thus, it is difficult for the user to distinguish the displayed image 306 in the display area 304 showing the temperature information in black from the foreground portion 308 that is dark.

Figure 3B:
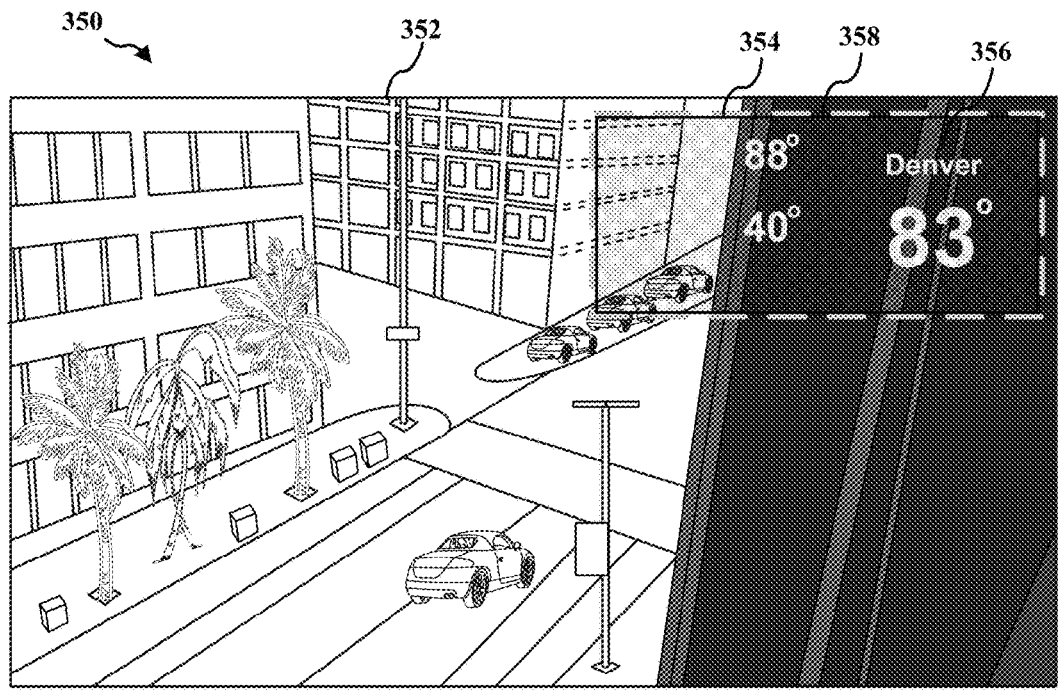
FIG. 3B is an example view in user's perspective when the user is viewing through a display of a wearable device, illustrating an aspect of the disclosure.

FIG. 3B is an example view 350 in user's perspective when the user is viewing through a display of a wearable device, illustrating an aspect of the disclosure. The example view 350 of FIG. 3B may occur after the example view 300 of FIG. 3A has occurred. In FIG. 3B, the user wearing the wearable device is staring at the same view of the road outside through the window as the view of FIG. 3A. Thus, a foreground 352 includes the same view as the foreground 302 of FIG. 3A. After the wearable starts displaying the image 306 in the display area 304 in FIG. 3A, the wearable device determines that a foreground portion 358 (dotted line) corresponding to the display area 304 is dark (e.g., having a brightness that is lower than a brightness threshold). Subsequently, the wearable device adjusts a display characteristic of the image 356 displayed in the display area 354 to make the displayed image 356 distinguishable from the foreground portion 358 corresponding to the display area 354. In particular, in FIG. 3B, the wearable device adjusts a display characteristic of the displayed image 356 such that a color brightness of the image including the temperature information is much higher (e.g., higher by at least a certain threshold) than the brightness of the foreground portion 358. Thus, in FIG. 3B, after adjusting the display characteristic of the displayed image 356, the displayed image 356 includes temperature information in a light color, which is distinguishable from the foreground portion 358 that is mostly dark.

Figure 4A:
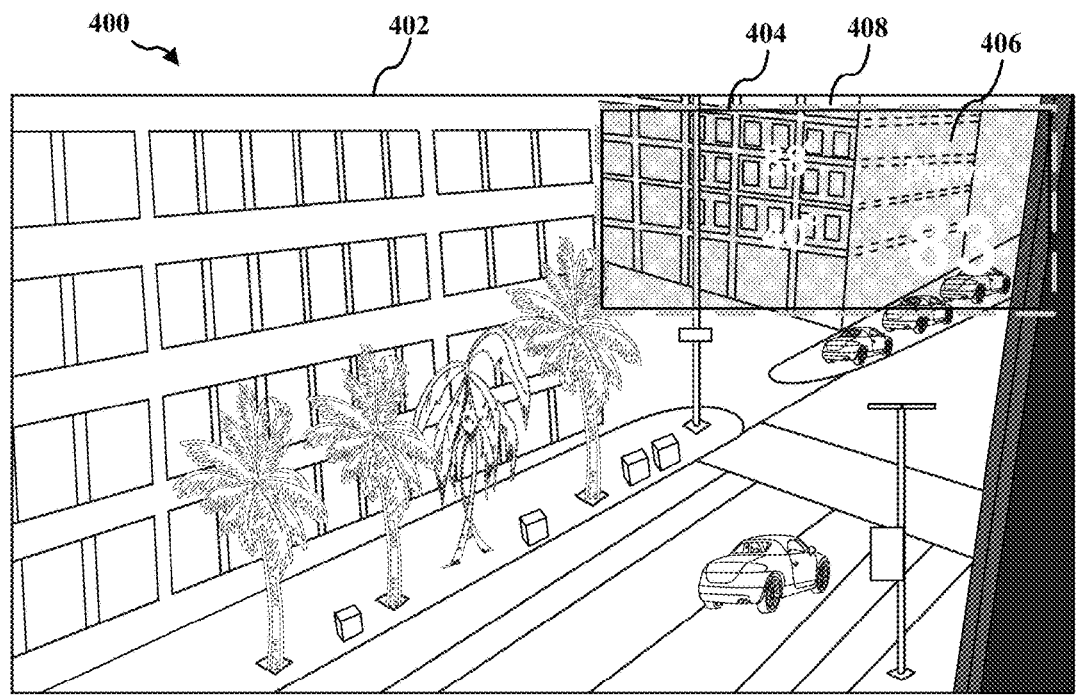
FIG. 4A is an example view in user's perspective when the user is viewing through a display of a wearable device, illustrating an aspect of the disclosure.

FIG. 4A is an example view 400 in user's perspective when the user is viewing through a display of a wearable device, illustrating an aspect of the disclosure. The example view 400 of FIG. 4A may occur after the example view 350 of FIG. 3B has occurred. FIG. 4A illustrates a view after the user wearing the wearable device has moved his/her head to the left since the view 350 of 3B. Thus, in FIG. 4A, a foreground 402 mostly includes a view of the road outside the window, and includes an edge of a dark window frame in a small portion of the foreground 402 on the right side. Unlike the foreground 352 of FIG. 3B, the right side of the foreground 402 does not include as much dark window frame as the foreground 352 of FIG. 3B. Thus, the displayed image 406 in a bright color in a display area 404 is not very distinguishable from a foreground portion 408 corresponding to the display area 404, where the foreground portion 408 is mostly in a bright color. However, the wearable device may determine not to adjust a display characteristic of the displayed image 406 at least because changing the display characteristic whenever there is a change in the foreground portion 408 may consume processing power and/or battery power. For example, if the user has already viewed the displayed image including the temperature information during the example view 350 of FIG. 3B, the user may not need to view the displayed image 406 again to learn the temperature information unless a change occurs in the displayed image 406, where the change in the displayed image 406 may be a change in the temperature information or displaying a different information other than the temperature information.

Figure 4B:
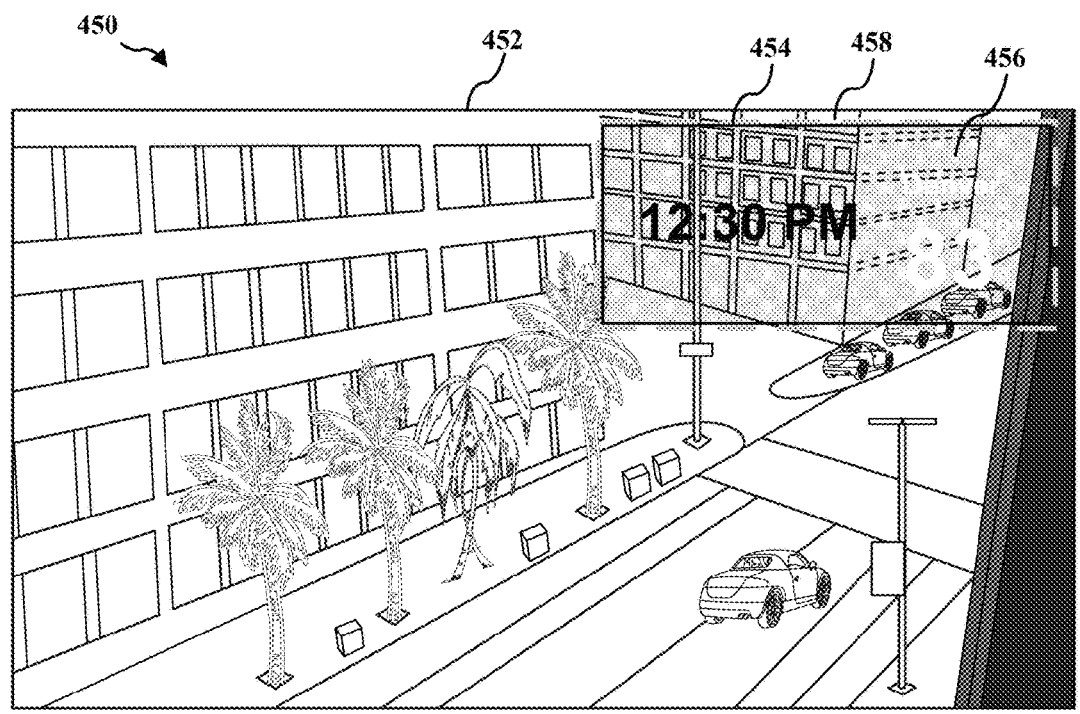
FIG. 4B is an example view in user's perspective when the user is viewing through a display of a wearable device, illustrating an aspect of the disclosure.

FIG. 4B is an example view 450 in user's perspective when the user is viewing through a display of a wearable device, illustrating an aspect of the disclosure. The example view 450 of FIG. 4B may occur after the example view 400 of FIG. 4A has occurred. A foreground 452 is the same as the foreground 402 of FIG. 4A. In FIG. 4B, the wearable device starts displaying an image 456 including a current time of 12:30 PM and a current temperature at Denver of 83 degrees in a display area 454. Thus, in FIG. 4B, a change in the displayed image 456 in the display area 454 has occurred to display the current time since the displayed image in the display area 404 of FIG. 4A. When the wearable device detects the change in the displayed image 456 in the display area 454, the wearable device may adjust a display characteristic of a changed portion of the displayed image 456 to make the changed portion more distinguishable from the foreground portion 458 corresponding to the display area 454. In FIG. 4B, the wearable device adjusts a display characteristic of an image portion displaying the current time to make the image portion darker in color, thus making the image portion distinguishable from the foreground portion 458 that is in mostly a light color.

Figure 5A:
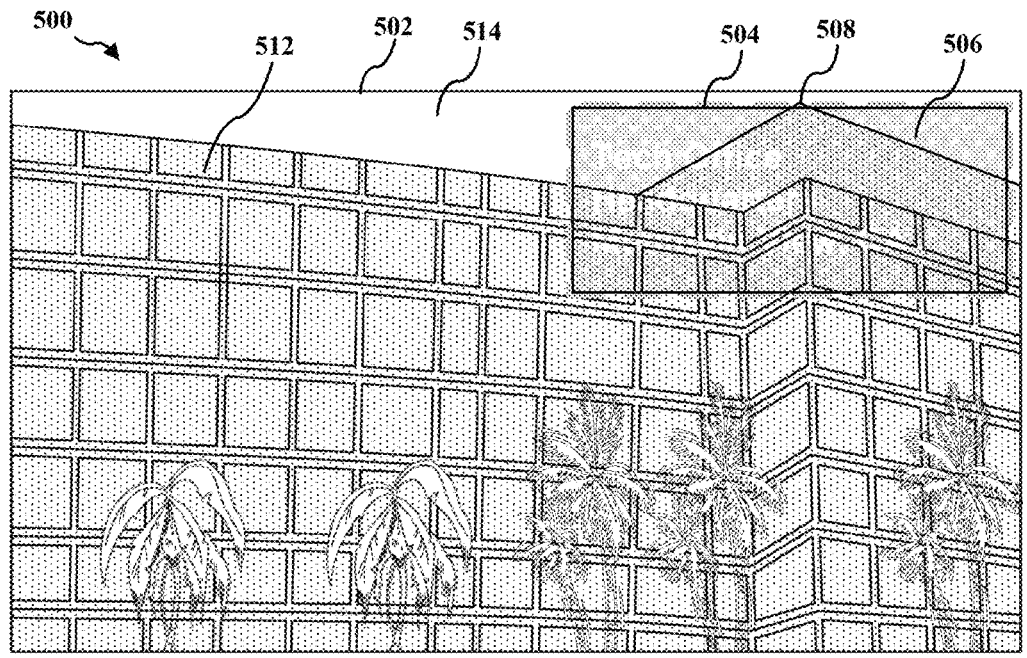
FIG. 5A is an example view in user's perspective when the user is viewing through a display of a wearable device.

FIG. 5A is an example view 500 in user's perspective when the user is viewing through a display of a wearable device. The example view 500 includes a foreground 502 and a display area 504. In FIG. 5A, the user wearing the wearable device is staring at a yellow building that is a headquarter of Tech Office. Thus, the foreground 502 includes a view of the yellow building 512, and further includes a blue sky above the yellow building. In FIG. 5A, the user activates the wearable device and the wearable device starts displaying in the display area 504 an image 506 showing the location of the Tech Office building in Mountain View, Calif. However, because the building 512 is yellow, a foreground portion 508 (a dotted line) corresponding to the display area 504 is mostly yellow. Thus, it may be difficult for the user to distinguish the displayed image 506 in the display area 504 showing the location information in a white color from the foreground portion 508 that is a yellow color because there may not be sufficient color contrast between the white color and the yellow color.

Figure 5B:
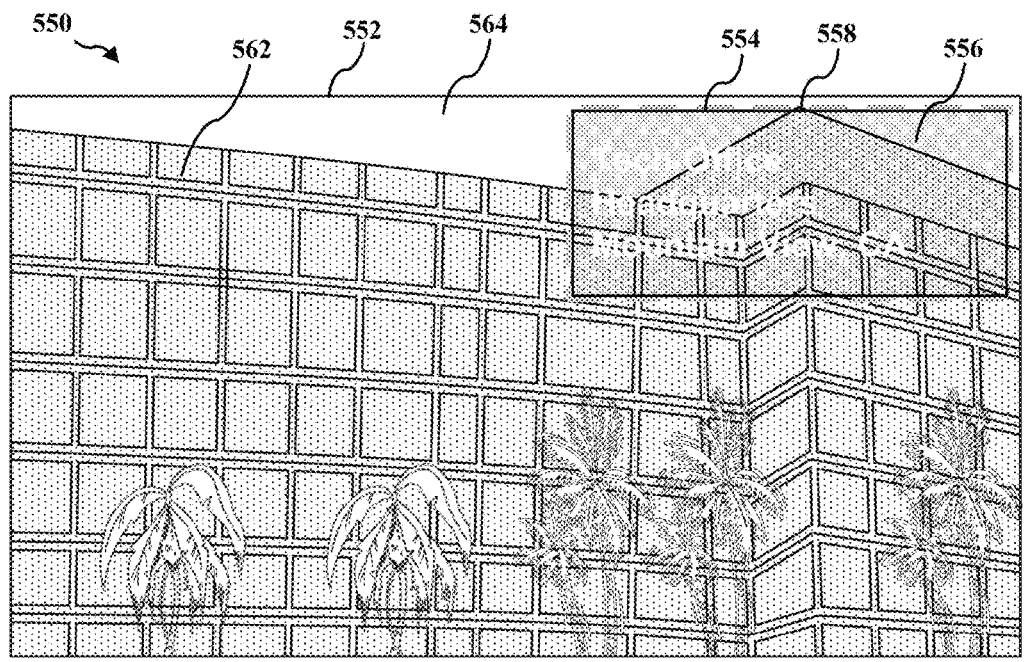
FIG. 5B is an example view in user's perspective when the user is viewing through a display of a wearable device, illustrating an aspect of the disclosure.

FIG. 5B is an example view 550 in user's perspective when the user is viewing through a display of a wearable device, illustrating an aspect of the disclosure. The example view 550 of FIG. 5B may occur after the example view 500 of FIG. 5A has occurred. In FIG. 5B, the user wearing the wearable device is staring at the same view of the yellow building 562 as the view of FIG. 5A. Thus, a foreground 552 includes the same view as the foreground 502 of FIG. 3A. After the wearable starts displaying the image 506 in the display area 504 in FIG. 5A, the wearable device determines that a foreground portion 558 (dotted line) corresponding to the display area 504 is in a color (yellow) that is not in sufficient color contrast with the color of the displayed image 506 (white). For example, the wearable device may determine that the color contrast ratio between the color of the display area 504 and the color of the displayed image 506 is below a color contrast threshold. Subsequently, the wearable device adjusts a display characteristic of the image 556 displayed in the display area 554 to make the displayed image 556 distinguishable from the foreground portion 558 corresponding to the display area 354. In particular, in FIG. 5B, the wearable device adjusts a display characteristic of the displayed image 556 such that there is sufficient color contrast between the color of the display area 554 and the color of the displayed image 556 is below a color contrast threshold. Thus, in FIG. 5B, after adjusting the display characteristic of the displayed image 356, the displayed image 556 includes the location information in a purple color, which is a contrasting color to the yellow color of the foreground portion 558.

Figure 6A:
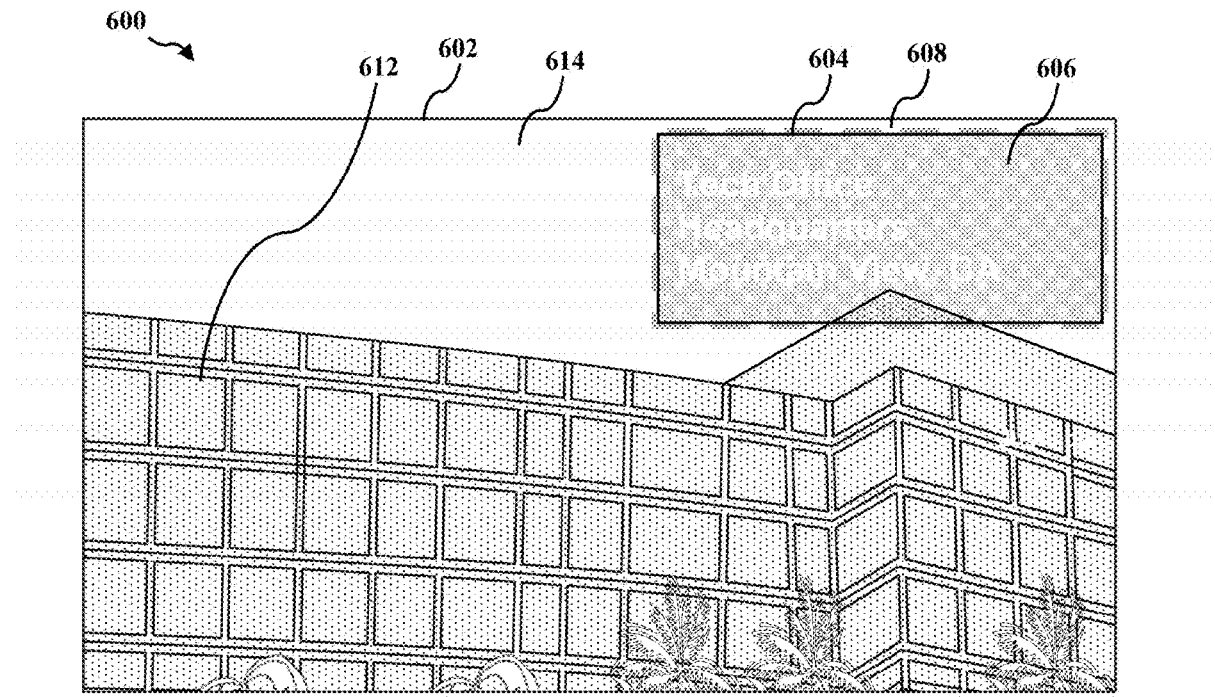
FIG. 6A is an example view in user's perspective when the user is viewing through a display of a wearable device, illustrating an aspect of the disclosure.

FIG. 6A is an example view 600 in user's perspective when the user is viewing through a display of a wearable device, illustrating an aspect of the disclosure. The example view 600 of FIG. 6A may occur after the example view 550 of FIG. 5B has occurred. FIG. 6A illustrates a view after the user wearing the wearable device has moved up his/her head more toward the sky 614 above the yellow building 612 since the view 550 of 5B. Thus, in FIG. 6A, the top half of a foreground 602 mostly includes a view of the blue sky 614, and the bottom half of the foreground 602 includes the yellow building 612. Unlike the foreground 552 of FIG. 5B, the foreground portion 608 is mostly blue because the foreground portion 608 is mostly the blue sky 614. Thus, the displayed image 606 in a purple color in a display area 604 is not very distinguishable from the foreground portion 408 that is mostly in the blue color. However, the wearable device may determine not to adjust a display characteristic of the displayed image 606 at least because changing the display characteristic whenever there is a change in the foreground portion 608 may consume processing power and/or battery power. For example, if the user has already viewed the displayed image including the location information during the example view 550 of FIG. 5B, the user may not need to view the displayed image 606 again to learn the location information unless a change occurs in the displayed image 606, where the change in the displayed image 606 may be a change in the location information or displaying a different information other than the location information.

Figure 6B:
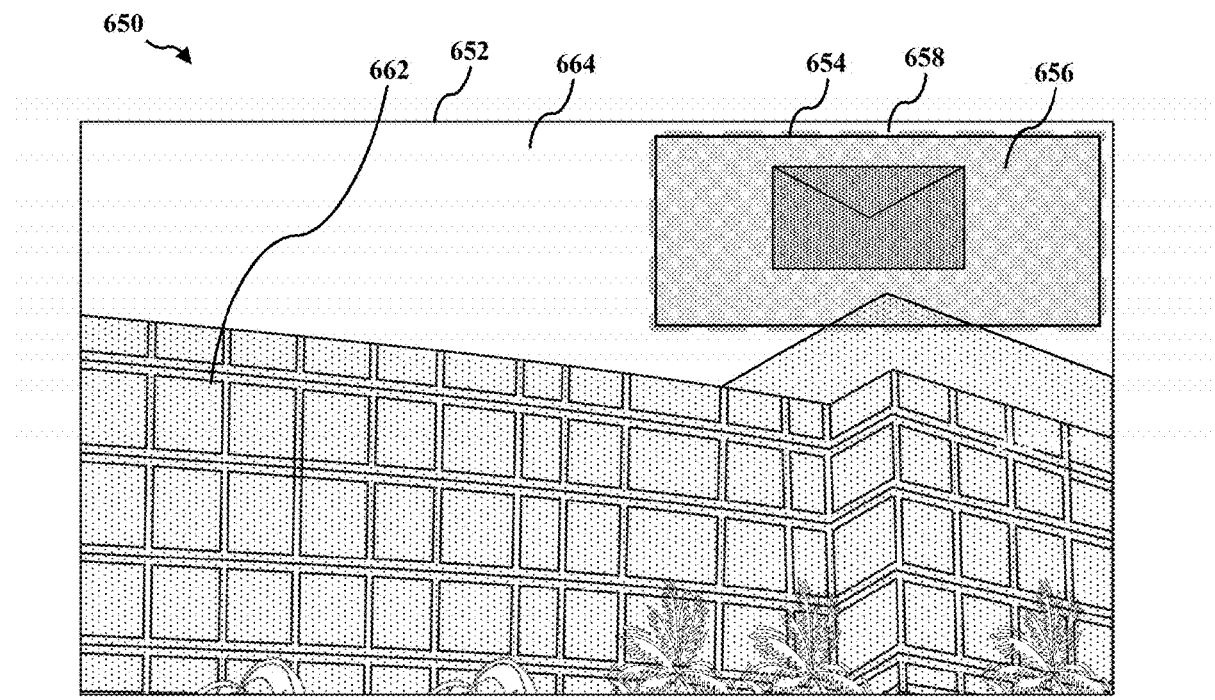
FIG. 6B is an example view in user's perspective when the user is viewing through a display of a wearable device, illustrating an aspect of the disclosure.

FIG. 6B is an example view 650 in user's perspective when the user is viewing through a display of a wearable device, illustrating an aspect of the disclosure. The example view 650 of FIG. 6B may occur after the example view 600 of FIG. 4A has occurred. A foreground 652 is the same as the foreground 602 of FIG. 6A. In FIG. 6B, the wearable device starts displaying an image 656 including an email indicator. Thus, in FIG. 6B, a change in the displayed image 656 in the display area 654 has occurred to display the email indicator since the displayed image in the display area 604 of FIG. 6A. When the wearable device detects the change in the displayed image 656 in the display area 654, the wearable device may adjust a display characteristic of a changed portion of the displayed image 656 to make the changed portion more distinguishable from the foreground portion 658 corresponding to the display area 654. In FIG. 6B, the wearable device adjusts a display characteristic of an image portion displaying the email indicator in the displayed image 656 to make the image portion to have sufficient color contrast from the foreground portion 658. In particular, the wearable device may display the email indicator in an orange color, which is a contrasting color to the blue color of the blue sky 664 in the foreground portion 658, thus making the image portion distinguishable from the foreground portion 658.

In another aspect, when a user is not using at least a portion of the wearable device, it may be desirable to conserve power of the wearable device (e.g., by disabling one or more functions of the wearable device). For example, if the user is not looking at an image displayed on a display of the wearable device, it may be preferable to conserve power of the wearable device by dimming a brightness of a display or disabling the display. Thus, according to another aspect of the disclosure, the wearable device determines whether the user is looking at the display, and adjusts the brightness of the display based on the determination. The wearable device may determine whether the user is looking at the display by detecting a position of a user eye. In an aspect, the wearable device may include a sensor to determine the position of the user eye. Based on the determined position of the user eye, the wearable may determine whether the user eye is aligned with the display of the display device in the wearable device. For example, the sensor may be a position sensor or an image sensor (e.g., a camera). The wearable device may determine the position of the user eye by detecting a position of a pupil or an iris of the user eye using the sensor. In one example, the wearable device may determine whether a pupil or an iris of the user eye is aligned with the display of the display device in the wearable device based on data from the sensor. If the wearable device determines that the pupil or the iris of the user eye is aligned with the display, the wearable device may determine that the user is looking at the display. Otherwise, the wearable device may determine that the user is not looking at the display.

If the wearable device determines based on the position of the user eye that the user is not looking at the display, the wearable device may dim the brightness of the display. In one example, the wearable device may dim the brightness of the display if the wearable device determines that the user is not looking at the display for a predetermined period of time. Sometime later, if the wearable device determines based on the position of the user eye that the user is looking at the display, the wearable device may return the brightness of the display from the dimmed display brightness to a previous display brightness level or a default display brightness level. In one example, the wearable device may return the brightness to a previous display brightness level or the default display brightness level if the wearable device determines that the user is looking at the display for a predetermined period of time.

Figure 7A:
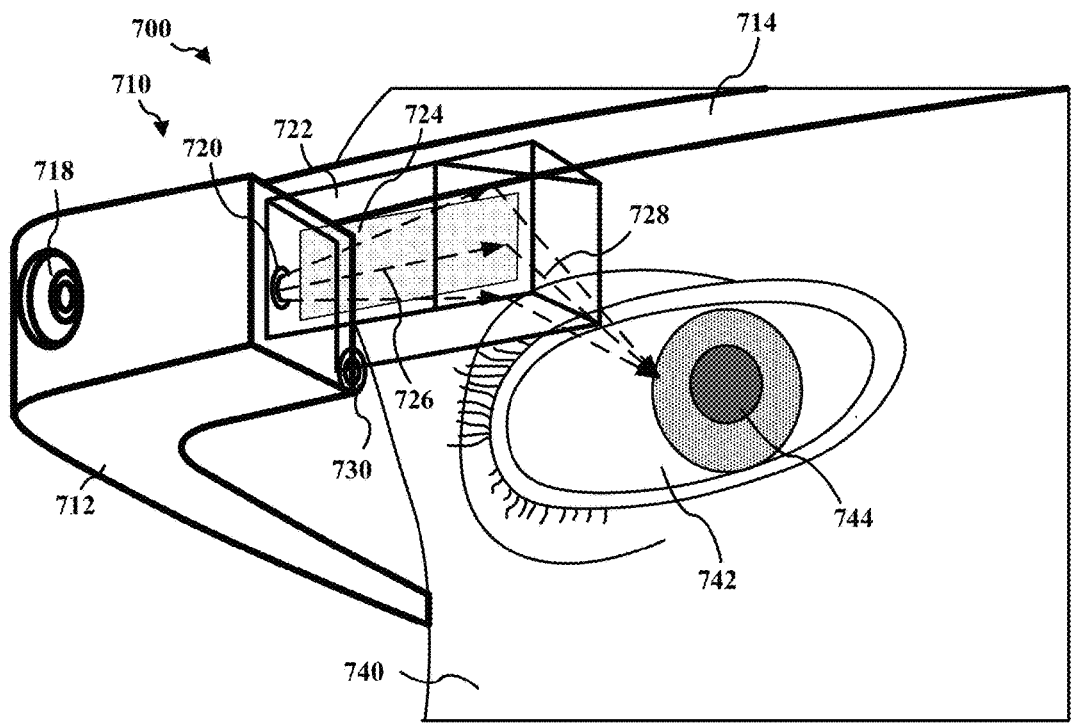
FIG. 7A is an example diagram illustrating a user wearing a wearable device having a display device with an eye looking away from the display, according to an aspect of the disclosure.

FIG. 7A is an example diagram 700 illustrating a user 740 wearing a wearable device having a display device with an eye looking away from the display, according to an aspect of the disclosure. In an aspect, the wearable device 710 may be similar to the wearable device 110 of FIG. 1, except for a feature of an eye detection sensor. The first side frame 712 is connected to a top frame 714. The first side frame 712 includes a front view sensor 718 and an image reproduction device 720. A display device 722 is connected to the first side frame 712, and is configured to display an image provided by the image reproduction device 720 on the display 724. The first side frame 712, the top frame 714, the front view sensor 718, the image reproduction device 720, and the display device 722 are equivalent to the first side frame 112, the top frame 114, the front view sensor 118, the image reproduction device 120, and the display device 122 of FIG. 1, respectively. Therefore, detailed explanations with respect to the first side frame 712, the top frame 714, the front view sensor 718, the image reproduction device 720, and the display device 722 are omitted for brevity. The display device 722 may include a prism that is configured to redirect a projected image from the image reproduction device 720 from a first direction 726 to a second direction 728 toward an eye 742 of the user 740, such that the user 740 may be able to view an image displayed on the display 724. The user 740 may move his/her pupil 244 of the eye 742 to a position for viewing the image redirected to the second direction 728. The wearable device 710 additionally includes an eye detection sensor 730 to detect a position and/or movement of the eye 742. In particular, the eye detection sensor 730 may detect a position and/or movement of the pupil 244 of the eye 742. In FIG. 7A, as the user 740 is not looking at the display 724, the user's pupil 744 does not align with a position of the display 724. For example, as the user 740 is looking away from the display 724, the pupil 244 is not aligned with the second direction 728 in which the image is directed to the eye 742. Thus, in FIG. 7A, the wearable device 710 determines based on the eye detection sensor 730 that the user's pupil 244 does not align with the position of the display 724. Consequently, the wearable device 710 dims the display 724.

Figure 7B:
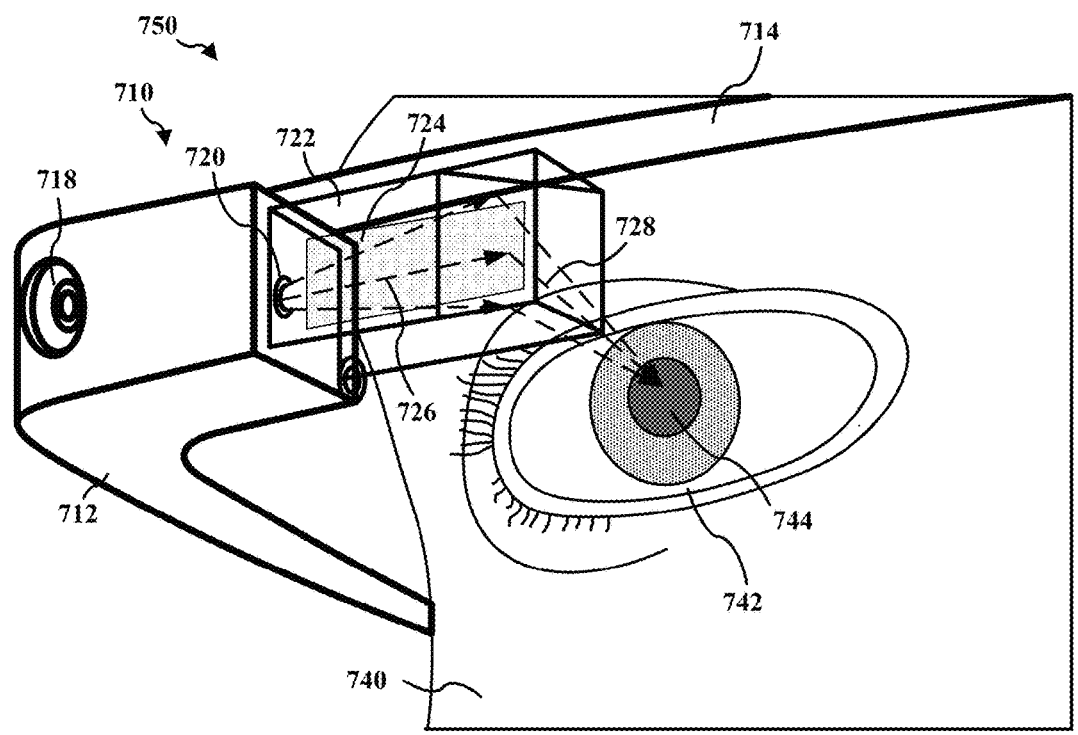
FIG. 7B is an example diagram illustrating a user wearing a wearable device having a display device with an eye looking at the display, according to an aspect of the disclosure.

FIG. 7B is an example diagram 750 illustrating a user 740 wearing a wearable device having a display device with an eye looking at the display, according to an aspect of the disclosure. As discussed above, the wearable device 710 includes an eye detection sensor 730 to detect a position and/or movement of the eye 742. In particular, the eye detection sensor 730 may detect a position and/or movement of the pupil 744 of the eye 742. In FIG. 7B, as the user 740 is looking at the display 724, the user's pupil 244 aligns with a position of the display 724. For example, as the user 740 is looking at the display 724, the pupil 244 is aligned with the second direction 728 in which the image is directed to the eye 742. Thus, in FIG. 7B, the wearable device 710 determines based on the eye detection sensor 730 that the user's pupil 244 aligns with the position of the display 724. Consequently, the wearable device 710 provides the display 724 at a default brightness. If the wearable device 710 previously dimmed the brightness, as explained in association with FIG. 7A, as the user's pupil 244 aligns with the position of the display 724, the wearable device 710 may start providing the display 724 at a default brightness or at a brightness level prior to dimming the brightness.

Figure 8:
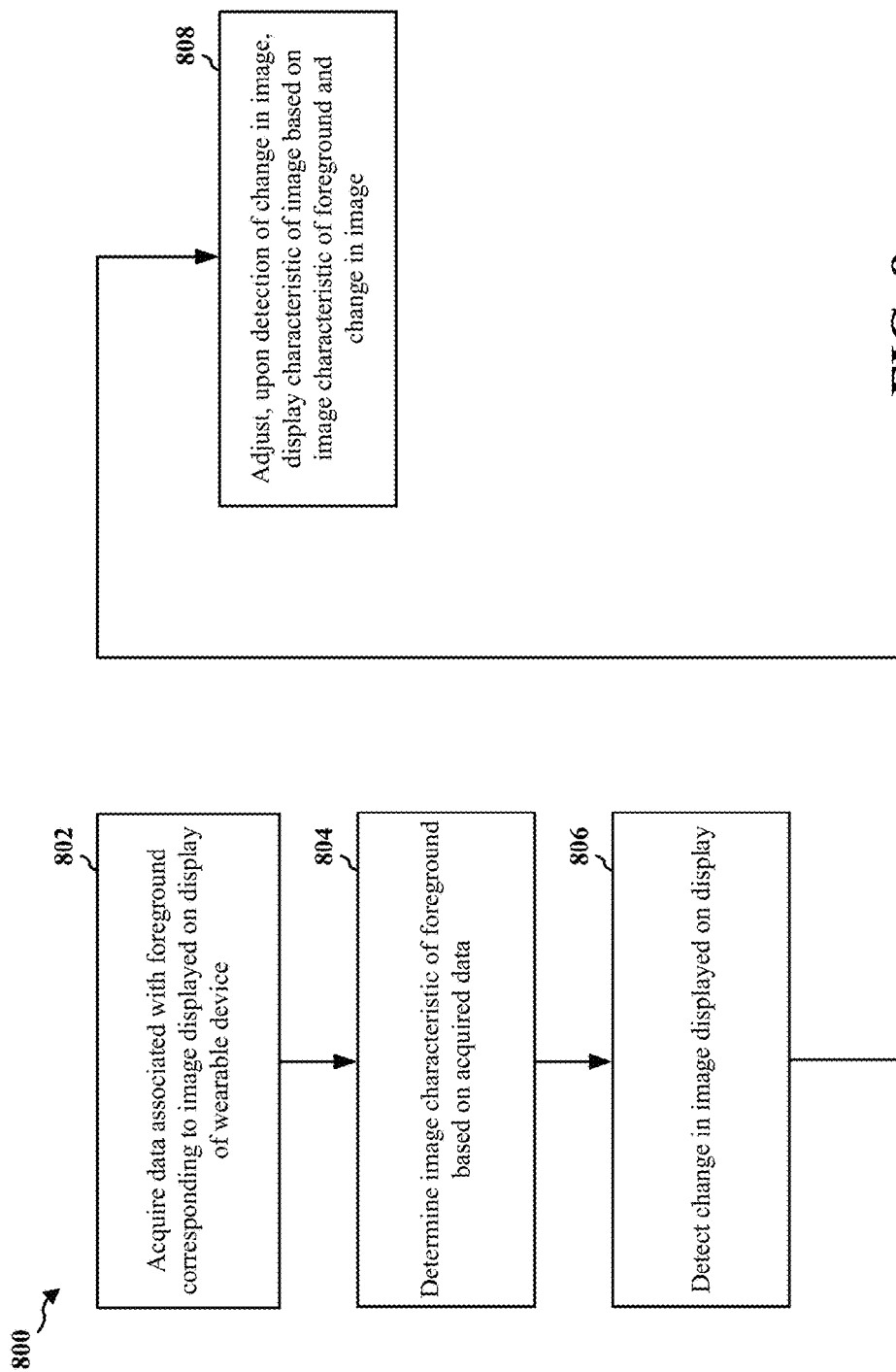
FIG. 8 is a flow chart of a method of managing a display device, according to an aspect of the disclosure.

FIG. 8 is a flow chart 800 of a method of managing a display device, according to an aspect of the disclosure. The method may be performed by a wearable device (e.g., the wearable device 210, the apparatus 1002/1002'). At 802, the wearable device acquires data associated with a foreground corresponding to an image displayed on a display of the wearable device. As discussed supra, for example, the wearable device may capture image data of a foreground using a front view sensor of the wearable device and determine the image data for the foreground portion corresponding to the display area. At 804, the wearable device determines an image characteristic of the foreground based on the acquired data. As discussed supra, for example, the wearable device determines an image characteristic of the foreground portion based on the captured data of the foreground portion.

At 806, the wearable device detects a change in the image displayed on the display. In an aspect, the detecting the change in the image displayed on the display includes detecting a changed portion of the image, and the adjusting the display characteristic of the image includes adjusting a display characteristic of the changed portion of the image based on the image characteristic of the foreground and an image characteristic of the changed portion of the image. In an aspect, the change in the image displayed on the display includes a display of new information in the image. At 808, the wearable device adjusts, upon the detection of the change in the image, a display characteristic of the image based on the image characteristic of the foreground and the change in the image. As discussed supra, for example, instead of continuously adjusting the display characteristic of the displayed image whenever the wearable device detects a change in the foreground portion, the wearable device may adjust the image characteristic of the displayed image when the wearable device determines that a change has occurred in the displayed image. As discussed supra, for example, change in the display image may occur when a content of the information in the displayed image is changed while the type of the information stays the same and/or when a type of the information in the displayed image is changed. In an aspect, the image characteristic of the foreground includes at least one of a brightness of the foreground or a color characteristic of the foreground, and the display characteristic of the image includes at least one of a brightness or a color characteristic of the image. As discussed supra, for example, the image characteristic may include a color brightness and/or a color characteristic of the foreground portion, and the display characteristic may include a color brightness and/or a color characteristic of the displayed image.

In an aspect, the acquired data includes a plurality of data samples, and the image characteristic of the foreground is determined based on an average of the plurality of data samples. As discussed supra, for example, the wearable device may determine the image characteristic based on multiple samples of the image data. As discussed supra, for example, if multiple samples are used to determine the image characteristic, the wearable device may average the multiple samples, and determine the image characteristic of the averaged samples.

In an aspect, the adjusting the display characteristic of the image comprises increasing a brightness of the image when the image characteristic of the foreground indicates that a brightness of the foreground is a below a brightness threshold, and decreasing the brightness of the image when the image characteristic of the foreground indicates that the brightness of the foreground is equal to or above the brightness threshold. As discussed supra, for example, the wearable device may determine that the foreground portion is dark or in a dark color if a color brightness of the foreground portion is below a color brightness threshold. As discussed supra, for example, if the image characteristic of the foreground portion indicates that the foreground portion is dark or in a dark color, the wearable device may increase the color brightness of the display image to make the displayed image more distinguishable from the dark foreground portion. As discussed supra, for example, the wearable device may determine that the foreground portion is bright or in a bright/light color if the color brightness of the foreground portion is equal to or above the color brightness threshold. As discussed supra, for example, if the image characteristic of the foreground portion indicates that the foreground portion is bright or in a bright/light color, the color brightness of the display image may be decreased to make the displayed image more distinguishable from the bright foreground portion.

In an aspect, the adjusting the display characteristic of the image comprises adjusting a color of the image to a color different from a color of the foreground when the image characteristic of the foreground indicates a same color as a color of the display characteristic of the image. As discussed supra, for example, the wearable device may adjust a color of the displayed image to a color that contrasts a color of the foreground portion if the color of the foreground portion is similar to the color of the displayed image. In an aspect, the adjusting the display characteristic of the image comprises adjusting a color of the image to increase a color contrast ratio with respect to the image characteristic of the foreground and the display characteristic of the image when the color contrast ratio is below a color contrast threshold. As discussed supra, for example, the wearable device may determine that the color of the foreground portion is similar to the color of the displayed image if a contrast ratio between the color of the foreground and the color of the displayed image is below a color contrast threshold. As discussed supra, for example, the wearable device may adjust the color of the displayed image to increase a color contrast ratio between the foreground portion and the displayed image to a value above the color contrast threshold.

In an aspect, the display is located between a user eye and the foreground. Referring back to FIG. 2A, for example, the display device 222 is connected to the first side frame 212, and is configured to display an image provided by the image reproduction device 220 on the display 224, and the display device 222 may include a prism that is configured to redirect a projected image from the image reproduction device 220 from a first direction 226 to a second direction 228 toward an eye 242 of the user 240. Referring back to FIG. 2B, the user 240 sees a foreground 252 with the user's eyes, where the foreground 252 is what the user sees in the user's natural field of view, and may also see a display area 254 that corresponds to the display 224 of the display device 222.

Figure 9:
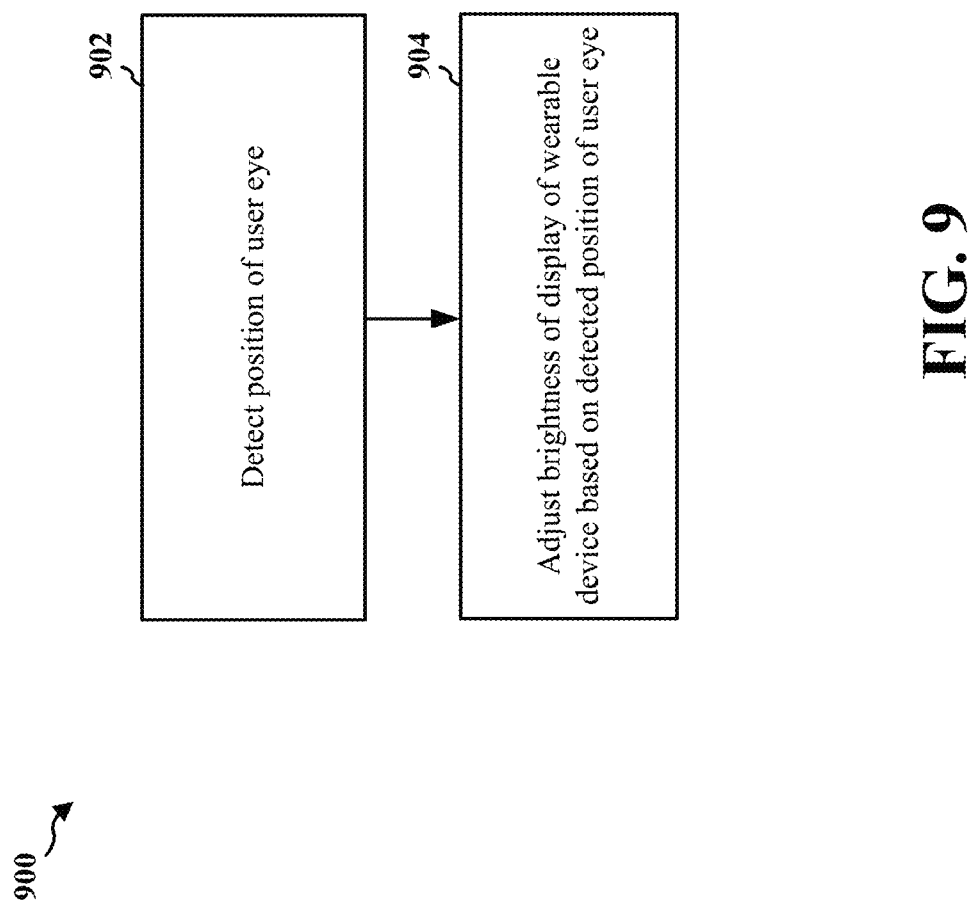
FIG. 9 is a flow chart of a method of managing a display device, according to another aspect of the disclosure.

FIG. 9 is a flow chart 900 of a method of managing a display device, according to another aspect of the disclosure. The method may be performed by a wearable device (e.g., the wearable device 710, the apparatus 1002/1002'). At step 902, the wearable device detects a position of a user eye. At step 904, the wearable device adjusts a brightness of a display of the wearable device based on the detected position of the user eye. As discussed supra, for example, the wearable device determines whether the user is looking at the display, and adjusts the brightness of the display based on the determination. As discussed supra, for example, the wearable device may determine whether the user is looking at the display by detecting a position of a user eye.

In an aspect, the brightness of the display is adjusted when the detected position of the user eye has changed from a first position to a second position for a predetermined period of time. In an aspect, the adjusting the brightness of the display comprises decreasing the brightness of the display when the detected position of the user eye is not aligned with a position of the display. In such an aspect, the adjusting the brightness of the display further comprises adjusting the brightness of the display to a default brightness when the user eye is aligned with the position of the display. As discussed supra, for example, the wearable device may dim the brightness of the display if the wearable device determines that the user is not looking at the display for a predetermined period of time. As discussed supra, if the wearable device determines based on the position of the user eye that the user is looking at the display, the wearable device may return the brightness of the display from the dimmed display brightness to a previous display brightness level or a default display brightness level. As discussed supra, for example, the wearable device may return the brightness to a previous display brightness level or the default display brightness level if the wearable device determines that the user is looking at the display for a predetermined period of time.

In an aspect, the detecting the position of the user eye comprises detecting a position of a pupil of the user eye. As discussed supra, for example, the wearable device may determine the position of the user eye by detecting a position of a pupil or an iris of the user eye using the sensor. In an aspect, the position of the user eye is detected by at least one of a sensor or a camera. As discussed supra, for example, the wearable device may include a sensor to determine the position of the user eye, and the sensor may be a position sensor or an image sensor (e.g., a camera). In an aspect, the display is configured to face the user eye when a user wears the wearable device. Referring back to FIG. 7A, for example, the display 724 faces the user eye 742 when the user wears the wearable device 710.

Figure 10:
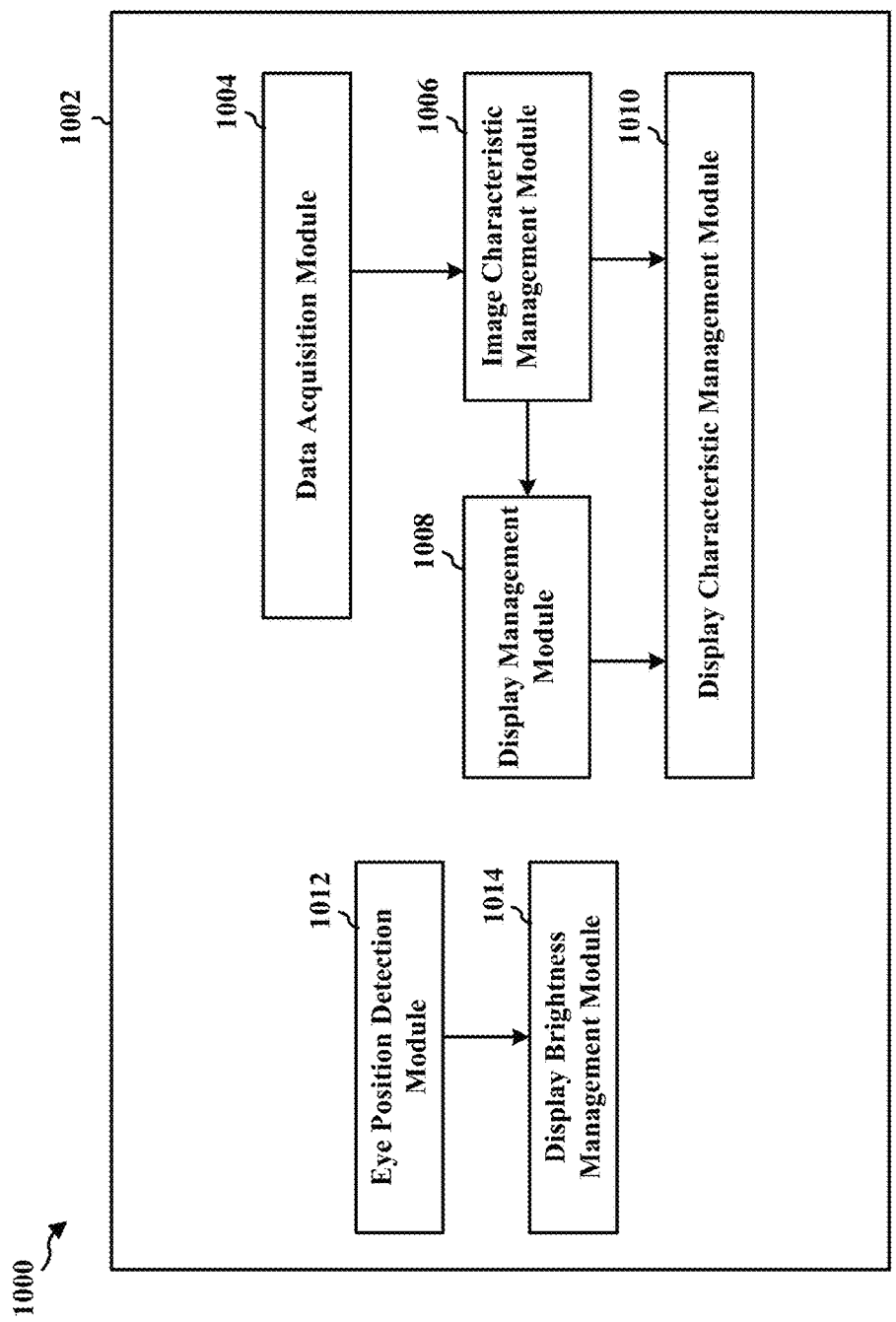
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus may be a wearable device. The apparatus includes a data acquisition module 1004, an image characteristic management module 1006, a display management module 1008, a display characteristic management module 1010, an eye position detection module 1012, and a display brightness management module 1014.

The data acquisition module 1004 acquires data associated with a foreground corresponding to an image displayed on a display of the wearable device. The image characteristic management module 1006 determines an image characteristic of the foreground based on the acquired data. The display management module 1008 detects a change in the image displayed on the display. In an aspect, the display management module 1008 detects the change in the image displayed on the display by detecting a changed portion of the image, and the adjusting the display characteristic of the image includes adjusting a display characteristic of the changed portion of the image based on the image characteristic of the foreground and an image characteristic of the changed portion of the image. In an aspect, the change in the image displayed on the display includes a display of new information in the image. The display characteristic management module 1010 adjusts, upon the detection of the change in the image, a display characteristic of the image based on the image characteristic of the foreground and the change in the image. In an aspect, the image characteristic of the foreground includes at least one of a brightness of the foreground or a color characteristic of the foreground, and the display characteristic of the image includes at least one of a brightness or a color characteristic of the image. In an aspect, the display is located between a user eye and the foreground. In an aspect, the acquired data includes a plurality of data samples, and the image characteristic of the foreground is determined based on an average of the plurality of data samples.

In an aspect, the display characteristic management module 1010 adjusts the display characteristic of the image by increasing a brightness of the image when the image characteristic of the foreground indicates that a brightness of the foreground is a below a brightness threshold, and decreasing the brightness of the image when the image characteristic of the foreground indicates that the brightness of the foreground is equal to or above the brightness threshold. In an aspect, the display characteristic management module 1010 adjusts the display characteristic of the image by adjusting a color of the image to a color different from a color of the foreground when the image characteristic of the foreground indicates a same color as a color of the display characteristic of the image. In an aspect, the display characteristic management module 1010 adjusts the display characteristic of the image by adjusting a color of the image to increase a color contrast ratio with respect to the image characteristic of the foreground and the display characteristic of the image when the color contrast ratio is below a color contrast threshold.

In another aspect, the eye position detection module 1012 detects a position of a user eye. The display brightness management module 1014 adjusts a brightness of a display of the wearable device based on the detected position of the user eye. In an aspect, the brightness of the display is adjusted when the detected position of the user eye has changed from a first position to a second position for a predetermined period of time. In an aspect, the display brightness management module 1014 adjusts the brightness of the display by decreasing the brightness of the display when the detected position of the user eye is not aligned with a position of the display. In such an aspect, the display brightness management module 1014 adjusts the brightness of the display by further adjusting the brightness of the display to a default brightness when the user eye is aligned with the position of the display.

In an aspect, the eye position detection module 1012 detects the position of the user eye by detecting a position of a pupil of the user eye. In an aspect, the position of the user eye is detected by at least one of a sensor or a camera. In an aspect, the display is configured to face the user eye when a user wears the wearable device.

The apparatus may include additional modules that perform each of the steps of the algorithm in the aforementioned flow charts of FIGS. 8 and 9. As such, each step in the aforementioned flow charts of FIGS. 8 and 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
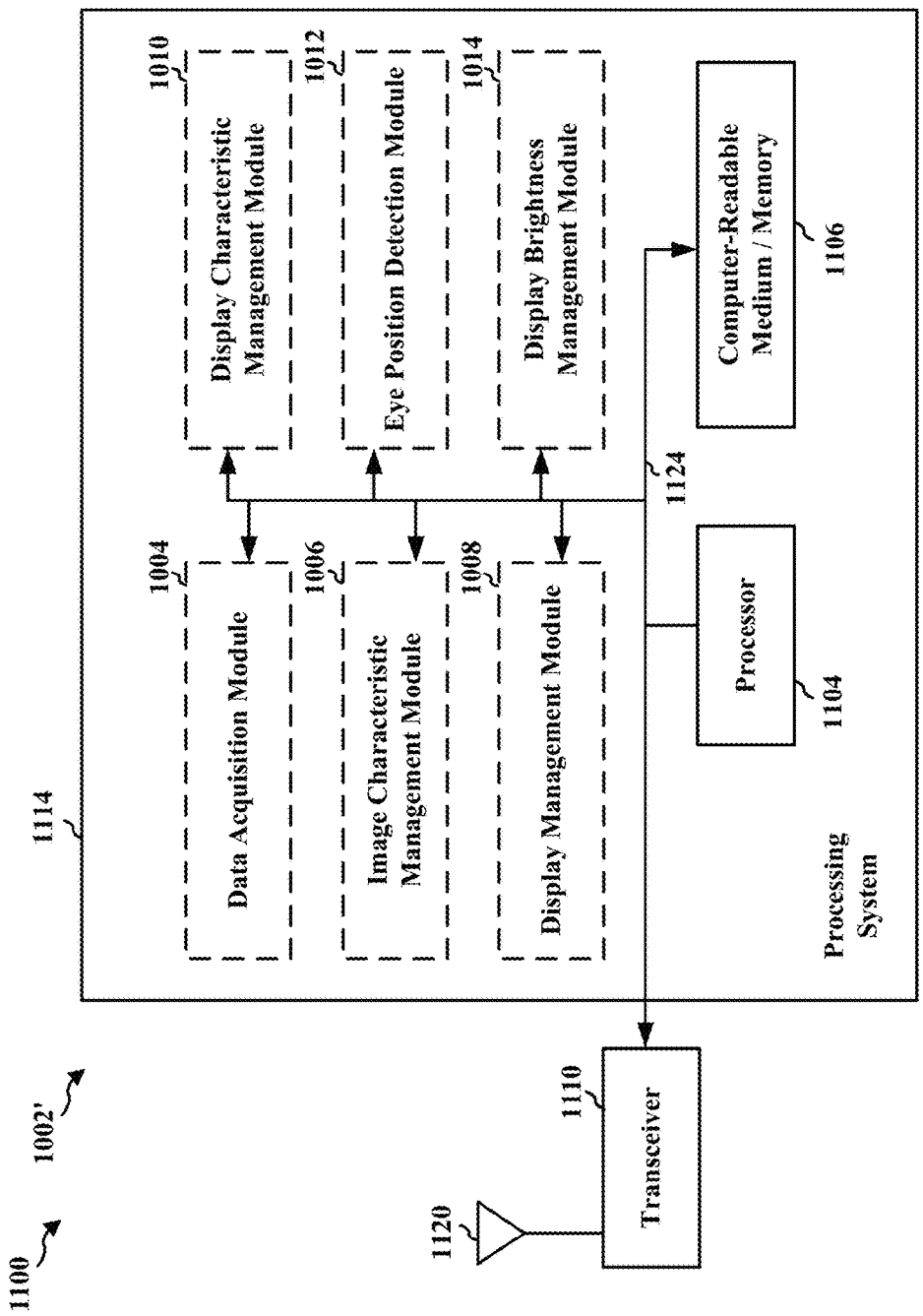
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1004, 1006, 1008, 1010, 1012, 1014, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114. In addition, the transceiver 1110 receives information from the processing system 1114, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system further includes at least one of the modules 1004, 1006, 1008, 1010, 1012, and 1014. The modules may be software modules running in the processor 1104, resident/stored in the computer readable medium/memory 1106, one or more hardware modules coupled to the processor 1104, or some combination thereof.

In one configuration, the apparatus 1002/1002' includes means for acquiring data associated with a foreground corresponding to an image displayed on a display of the wearable device, means for determining an image characteristic of the foreground based on the acquired data, means for detecting a change in the image displayed on the display, and means for adjusting, upon the detection of the change in the image, a display characteristic of the image based on the image characteristic of the foreground and the change in the image. The apparatus 1002/1002' also includes means for detecting a position of a user eye and means for adjusting a brightness of a display of the wearable device based on the detected position of the user eye. The aforementioned means may be one or more of the aforementioned modules of the apparatus 1002 and/or the processing system 1114 of the apparatus 1002' configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members What it claimed is:

1. A method by a wearable device, comprising:
acquiring data associated with a foreground corresponding to an image displayed on a display of the wearable device;
determining an image characteristic of the foreground based on the acquired data;
detecting whether a change has occurred in image data for the image displayed on the display, the change in the image data including a change in at least one of a content or a type of the image data;
adjusting, upon the detection of the change in the image data, a color of the image based on the image characteristic of the foreground and the image after the change in the image data when the change has occurred in the image data; and
refraining from adjusting the color of the image when a time period after a change in the image characteristic of the foreground is less than a threshold time period and no change has occurred in the image data.

2. The method of claim 1, wherein the detecting whether the change has occurred in the image data includes detecting a changed portion of the image, and
wherein the adjusting the color of the image includes adjusting a color of the changed portion of the image based on the image characteristic of the foreground and an image characteristic of the changed portion of the image.

3. The method of claim 1, wherein the change in the image display causes displaying of new information in the image.

4. The method of claim 1, wherein the image characteristic of the foreground includes at least one of a color brightness of the foreground or a color characteristic of the foreground, and
wherein the color of the image includes at least one of a color brightness or a color characteristic of the image.

5. The method of claim 1, wherein the acquired data includes a plurality of data samples, and the image characteristic of the foreground is determined based on an average of the plurality of data samples.

6. The method of claim 1, wherein the adjusting the color of the image comprises:
increasing a brightness of the image when the image characteristic of the foreground indicates that a brightness of the foreground is below a brightness threshold; and
decreasing the brightness of the image when the image characteristic of the foreground indicates that the brightness of the foreground is equal to or above the brightness threshold.

7. The method of claim 1, wherein the adjusting the color of the image comprises:
adjusting a color of the image to a color different from a color of the foreground when the image characteristic of the foreground indicates a same color as a color of the color of the image.

8. The method of claim 1, wherein the adjusting the color of the image comprises:
adjusting a color of the image to increase a color contrast ratio with respect to the image characteristic of the foreground and the color of the image when the color contrast ratio is below a color contrast threshold.

9. The method of claim 1, wherein the display is located between a user eye and the foreground.

10. A wearable device, comprising:
means for acquiring data associated with a foreground corresponding to an image displayed on a display of the wearable device;
means for determining an image characteristic of the foreground based on the acquired data;
means for detecting whether a change has occurred in image data for the image displayed on the display, the change in the image data including a change in at least one of a content or a type of the image data;
means for adjusting, upon the detection of the change in the image data, a color of the image based on the image characteristic of the foreground and the image after the change in the image data when the change has occurred in the image data; and
means for refraining from adjusting the color of the image when a time period after a change in the image characteristic of the foreground is less than a threshold time period and no change has occurred in the image data.

11. The wearable device of claim 10, wherein the means for detecting whether the change has occurred in the image data is configured to detect a changed portion of the image, and
wherein the means for adjusting the color of the image is configured to adjust a color of the changed portion of the image based on the image characteristic of the foreground and an image characteristic of the changed portion of the image.

12. The wearable device of claim 10, wherein the change in the image display causes displaying of new information in the image.

13. The wearable device of claim 10, wherein the image characteristic of the foreground includes at least one of a brightness of the foreground or a color characteristic of the foreground, and
wherein the color of the image includes at least one of a brightness or a color characteristic of the image.

14. The wearable device of claim 10, wherein the acquired data includes a plurality of data samples, and the image characteristic of the foreground is determined based on an average of the plurality of data samples.

15. The wearable device of claim 10, wherein the means for adjusting the display characteristic of the image is configured to:
increase a brightness of the image when the image characteristic of the foreground indicates that a brightness of the foreground is below a brightness threshold; and
decrease the brightness of the image when the image characteristic of the foreground indicates that the brightness of the foreground is equal to or above the brightness threshold.

16. The wearable device of claim 10, wherein the means for adjusting the color of the image is configured to:
adjust a color of the image to a color different from a color of the foreground when the image characteristic of the foreground indicates a same color as a color of the color of the image.

17. The wearable device of claim 10, wherein the means for adjusting the color of the image is configured to:

adjust a color of the image to increase a color contrast ratio with respect to the image characteristic of the foreground and the color of the image when the color contrast ratio is below a color contrast threshold.

18. The wearable device of claim 10, wherein the display is located between a user eye and the foreground.

19. A wearable device, comprising:
a memory; and
at least one processor coupled to the memory and configured to:
acquire data associated with a foreground corresponding to an image displayed on a display of the wearable device;
determine an image characteristic of the foreground based on the acquired data;
detect whether a change has occurred in image data for the image displayed on the display, the change in the image data including a change in at least one of a content or a type of the image data;
adjust, upon the detection of the change in the image data, a color of the image based on the image characteristic of the foreground and the image after the change in the image data when the change has occurred in the image data; and
refrain from adjusting the color of the image when a time period after a change in the image characteristic of the foreground is less than a threshold time period and no change has occurred in the image data.

20. The wearable device of claim 19, wherein the at least one processor configured to detect whether the change has occurred in the image data is configured to detect a changed portion of the image, and
wherein the at least one processor configured to adjust the color of the image is configured to adjust a color of the changed portion of the image based on the image characteristic of the foreground and an image characteristic of the changed portion of the image.

21. The wearable device of claim 19, wherein the change in the image display causes displaying of new information in the image.

22. The wearable device of claim 19, wherein the image characteristic of the foreground includes at least one of a brightness of the foreground or a color characteristic of the foreground, and
wherein the color of the image includes at least one of a brightness or a color characteristic of the image.

23. The wearable device of claim 19, wherein the acquired data includes a plurality of data samples, and the image characteristic of the foreground is determined based on an average of the plurality of data samples.

24. The wearable device of claim 19, wherein the at least one processor configured to adjust the color of the image is configured to:
increase a brightness of the image when the image characteristic of the foreground indicates that a brightness of the foreground is below a brightness threshold; and
decrease the brightness of the image when the image characteristic of the foreground indicates that the brightness of the foreground is equal to or above the brightness threshold.

25. The wearable device of claim 19, wherein the at least one processor configured to adjust the color of the image is configured to:
adjust a color of the image to a color different from a color of the foreground when the image characteristic of the foreground indicates a same color as a color of the color of the image.

26. The wearable device of claim 19, wherein the at least one processor configured to adjust the color of the image is configured to:
adjust a color of the image to increase a color contrast ratio with respect to the image characteristic of the foreground and the color of the image when the color contrast ratio is below a color contrast threshold.

27. The wearable device of claim 19, wherein the display is located between a user eye and the foreground.

28. A non-transitory computer-readable medium for a wearable device storing computer executable code, comprising code to:
acquire data associated with a foreground corresponding to an image displayed on a display of the wearable device;
determine an image characteristic of the foreground based on the acquired data;
detect whether a change has occurred in image data for the image displayed on the display, the change in the image data including a change in at least one of a content or a type of the image data;
adjust, upon the detection of the change in the image data, a color of the image based on the image characteristic of the foreground and the image after the change in the image data when the change has occurred in the image data; and
refrain from adjusting the color of the image when a time period after a change in the image characteristic of the foreground is less than a threshold time period and no change has occurred in the image data.

29. The non-transitory computer-readable medium of claim 28, wherein the code to detect whether the change has occurred in the image data comprises code to detect a changed portion of the image, and
wherein the code to adjust the color of the image comprises code to adjust a color of the changed portion of the image based on the image characteristic of the foreground and an image characteristic of the changed portion of the image.

30. The non-transitory computer-readable medium of claim 28, wherein the image characteristic of the foreground includes at least one of a brightness of the foreground or a color characteristic of the foreground, and
wherein the color of the image includes at least one of a brightness or a color characteristic of the image.

* * * * *